United States Patent
Cortelli et al.

(10) Patent No.: US 9,157,374 B2
(45) Date of Patent: Oct. 13, 2015

(54) ANTIROTATED PISTON RACK

(75) Inventors: Todd D. Cortelli, Springfield, MA (US); Matthew R. Greco, Wayne, NJ (US); Paul D. Boyce, Granby, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 349 days.

(21) Appl. No.: 13/600,415

(22) Filed: Aug. 31, 2012

(65) Prior Publication Data
US 2014/0060076 A1 Mar. 6, 2014

(51) Int. Cl.
*F02C 7/27* (2006.01)
*F16K 27/06* (2006.01)
*F16K 31/54* (2006.01)
*F02C 7/32* (2006.01)

(52) U.S. Cl.
CPC ... *F02C 7/32* (2013.01); *F02C 7/27* (2013.01); *F16K 27/06* (2013.01); *F16K 31/54* (2013.01); *F05D 2260/83* (2013.01); *Y10T 137/0519* (2015.04)

(58) Field of Classification Search
CPC .............. F02C 7/27; F02C 7/26; F02C 7/277; F16K 27/065; F16K 31/54; F20C 7/32
USPC .......................... 60/787; 137/15.24; 251/250
See application file for complete search history.

(56) References Cited

U.S. PATENT DOCUMENTS

| | | | |
|---|---|---|---|
| 2,753,889 A * | 7/1956 | Carr et al. | 137/630.15 |
| 4,077,202 A * | 3/1978 | Schutze | 60/788 |
| 7,028,985 B2 | 4/2006 | LaVergne, Jr. | |
| 7,165,947 B2 | 1/2007 | Hattori et al. | |
| 7,353,636 B1 | 4/2008 | Anderson et al. | |
| 7,614,317 B2 | 11/2009 | Sickert et al. | |
| 7,677,125 B2 | 3/2010 | Rotter | |
| 7,695,355 B2 | 4/2010 | Doherty | |
| 7,739,793 B2 | 6/2010 | Yamamoto et al. | |
| 7,740,228 B2 | 6/2010 | Simpson et al. | |
| 7,926,376 B2 | 4/2011 | Hirose et al. | |
| 8,015,825 B2 | 9/2011 | Elder et al. | |
| 8,127,786 B2 | 3/2012 | Emmons | |

FOREIGN PATENT DOCUMENTS

CN 201159127 Y 12/2008
SU 723198 A1 3/1980

* cited by examiner

*Primary Examiner* — Phutthiwat Wongwian
*Assistant Examiner* — William Breazeal
(74) *Attorney, Agent, or Firm* — Carlson, Gaskey & Olds, PC

(57) ABSTRACT

A valve skirt is connected to a shaft. The shaft extends in a rearward direction away from the skirt and has rack teeth at a location spaced away from the skirt. A tab is positioned between the skirt and the rack teeth, and has at least one flat surface. A rack support supports the rack for axial movement, and the rack support has a support ear that has a flat surface engaging the flat surface on the rack to prevent relative rotation of the rack when driven by a pinion gear. An air starter valve, a gas turbine engine and a method are also disclosed.

17 Claims, 4 Drawing Sheets

ANTIROTATED PISTON RACK

BACKGROUND OF THE INVENTION

This application relates to a rack and pinion connection for use in a manual wrench drive for an air starter valve.

Air starter valves are known, and are utilized in conjunction with gas turbine engines to provide air to the starter when the engine is being started. The flow of air to the starter is stopped by the starter air valve once the engine has started.

In one known air starter valve, a manual wrench drive allows movement of the valve for maintenance, or for repair. The valve is normally moveable upon control of a solenoid valve. However, should the valve fail, the manual wrench drive can also move the valve to an open position.

The manual wrench drive typically drives rotation of a pinion gear which in turn drives rack teeth associated with a shaft to move a valve skirt. The rack has generally been machined into a cylindrical portion of the shaft which is connected to the valve skirt. The valve skirt, shaft, and rack, as a unit, were able to rotate relative to the housing.

SUMMARY OF THE INVENTION

A valve skirt is connected to a shaft. The shaft extends in a rearward direction away from the skirt and has rack teeth at a location spaced away from the skirt. A tab is positioned between the skirt and the rack teeth, and has at least one flat surface. A rack support supports the rack for axial movement, and the rack support has at least one support ear that has a flat surface engaging the flat surface on the rack to prevent relative rotation of the rack when driven by a pinion gear. An air starter valve, a gas turbine engine and a method are also disclosed.

These and other features of the present invention will be best understood from the following specification and drawings, the following of which is a brief description.

DETAILED DESCRIPTION

Figure 1A:
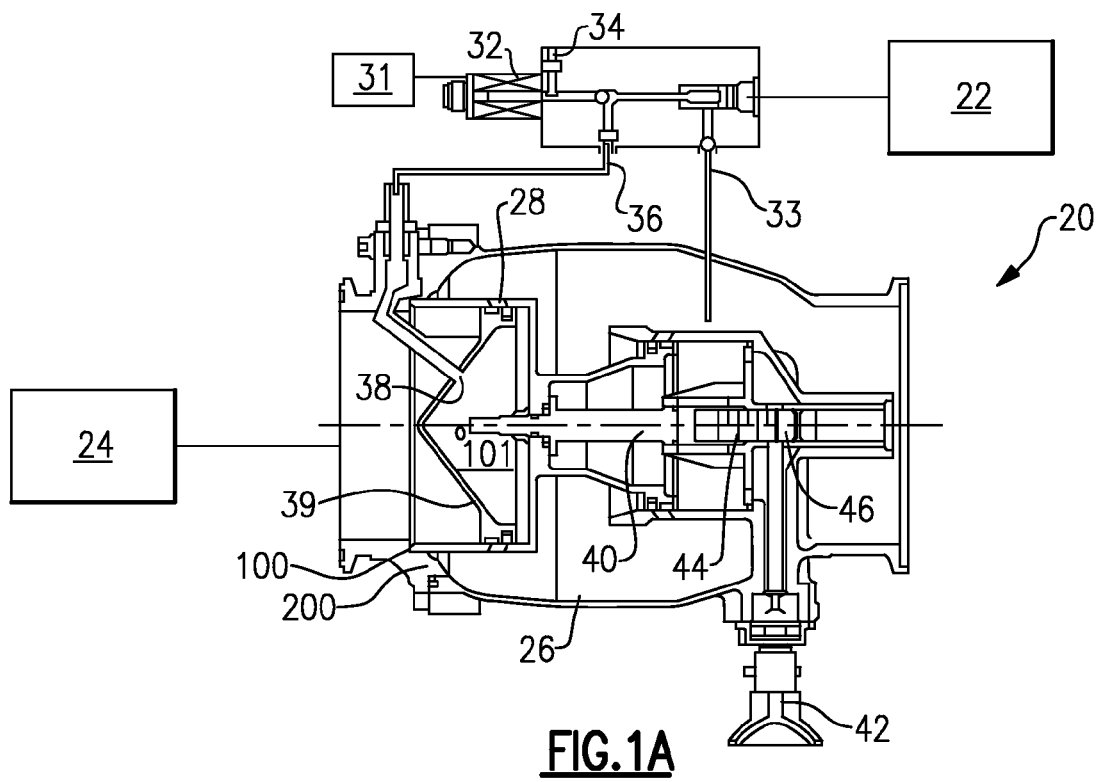
FIG. 1A shows an air starter valve in a closed position.
Figure 1B:
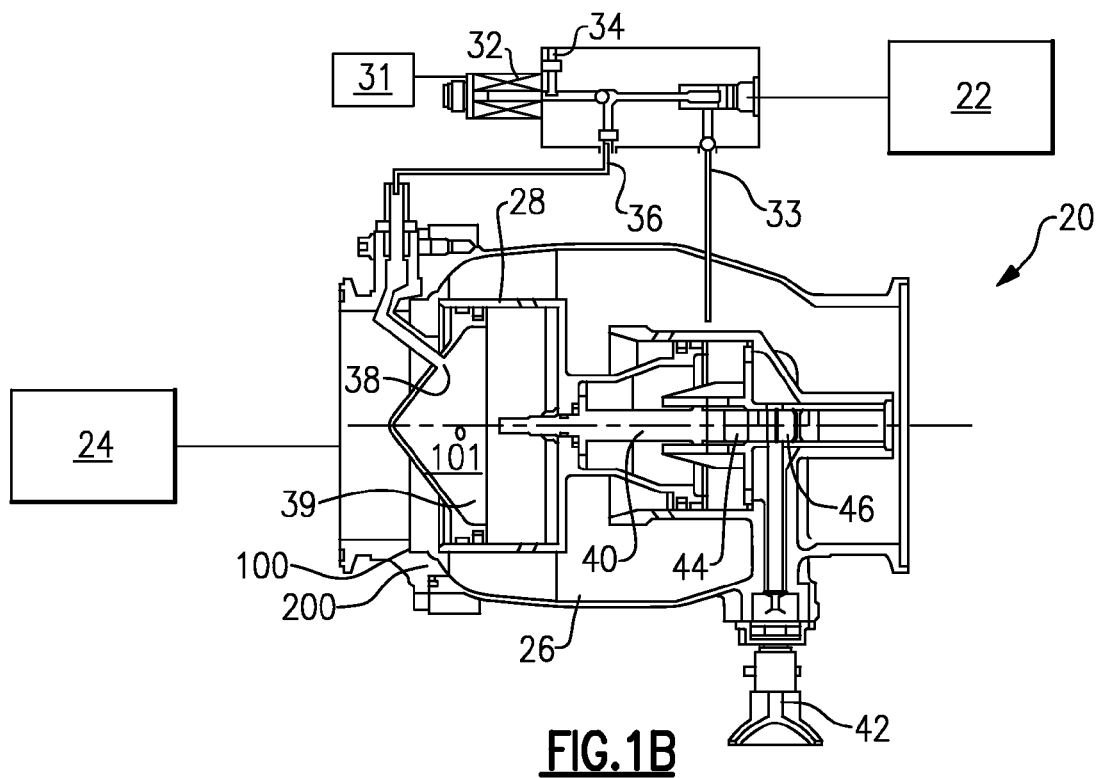
FIG. 1B shows the FIG. 1A valve in an open position.

An air starter valve 20 supplies air from an air source 22 to a gas turbine engine starter 24, as illustrated in FIG. 1A, at start-up of a gas turbine engine. As shown, a valve skirt 28 moves relative to an internal piston housing 39 to block or allow flow between an outer surface of the skirt 28 and a housing 200. As shown in FIG. 1A, a forward end 100 of the skirt is sealed against the housing 200, and air will not flow to the starter 24. This position is obtained since the air from the source 22 acts against a rear face of the skirt 28 and drives it to the left in this Figure. A solenoid 32 communicates with a control 31 to cause the opening and closing of the valve skirt 28, as desired. The control 31 may be an electronic control which is programmed to provide air to the starter 24 from the source 22. Solenoid 32 controls the connection of a path 33 of pressurized air from source 22 through a line 36, and into an outlet 38 in a chamber 101. As will be explained, this will drive the skirt 28 to an open position (see FIG. 1B). Alternatively, the solenoid 32 can be moved to a position which communicates the connection 36 to atmosphere at 34. In this position, the pressurized air from the source 22 will drive the valve skirt 28 to the closed position (FIG. 1A).

When it is desired to open the valve, solenoid 32 moves to allow supply of the pressurized air from tap 33 through a line 36 to an internal chamber 101 defined between the housing 39 and the skirt 28, and through a fluid connection 38. When pressurized air is delivered into this chamber, it forces skirt 28 to the right as shown in this Figure such that forward end 100 no longer seals against the housing 200. In this position, air can flow from source 22 to the starter 24.

Under certain conditions, it is desirable to manually move the piston between the open and closed position. Thus, a manual wrench connection 42 is provided to turn a pinion gear 46, and drive a rack 44 to move shaft 40, and hence the valve skirt 28.

Figure 2A:
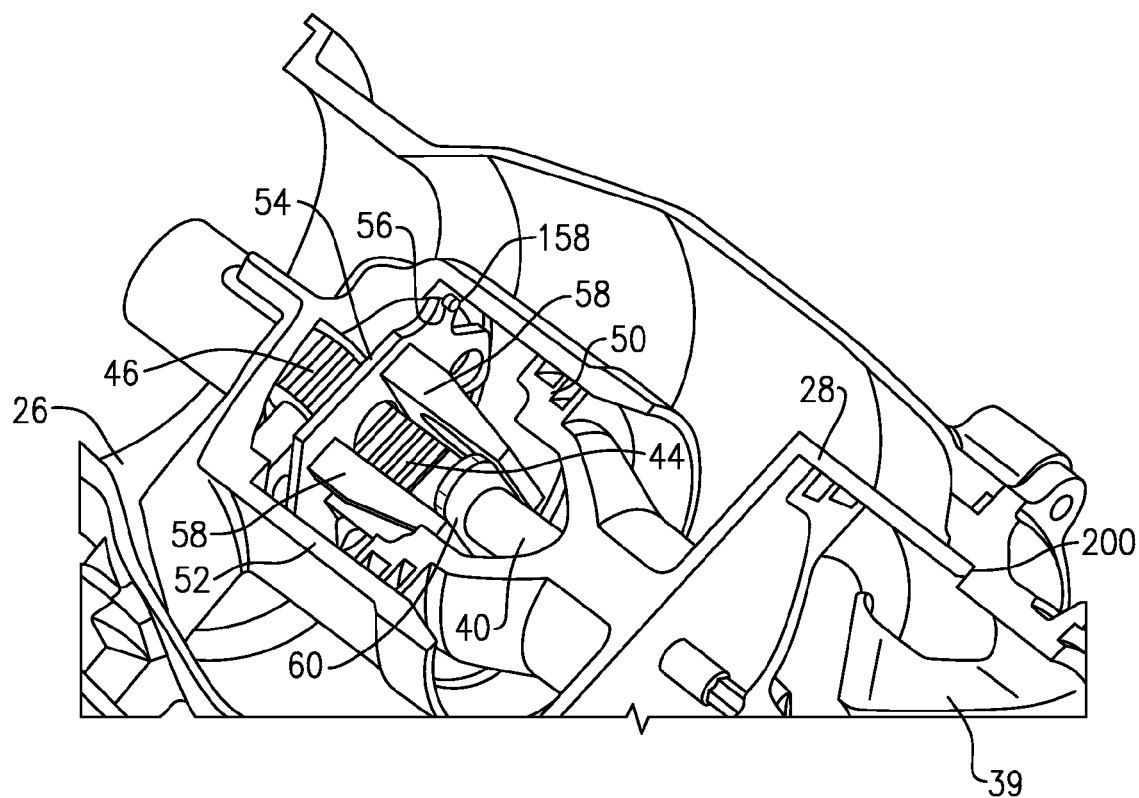
FIG. 2A shows detail of a manual drive arrangement with the valve in the closed position.

As shown in FIG. 2A, the rack teeth 44 are positioned adjacent to a tab 60. Tab 60 is guided between support ears 58 which extend on opposed sides of the tab 60. The ears 58 are part of a rack support 54. Rack support 54 has a pin locating slot 56 which receives a pin 158 from an outer housing 26 to ensure that the rack support 54 is properly located circumferentially, and properly guides the tab 60 between the ears 58 for axial movement while limiting relative rotation.

As can be seen, the support 54 is positioned between the valve skirt 28 and the pinion gear 46. In the position shown in FIG. 2A, tab 60 is spaced from the support 54. This is the closed position.

Figure 2B:
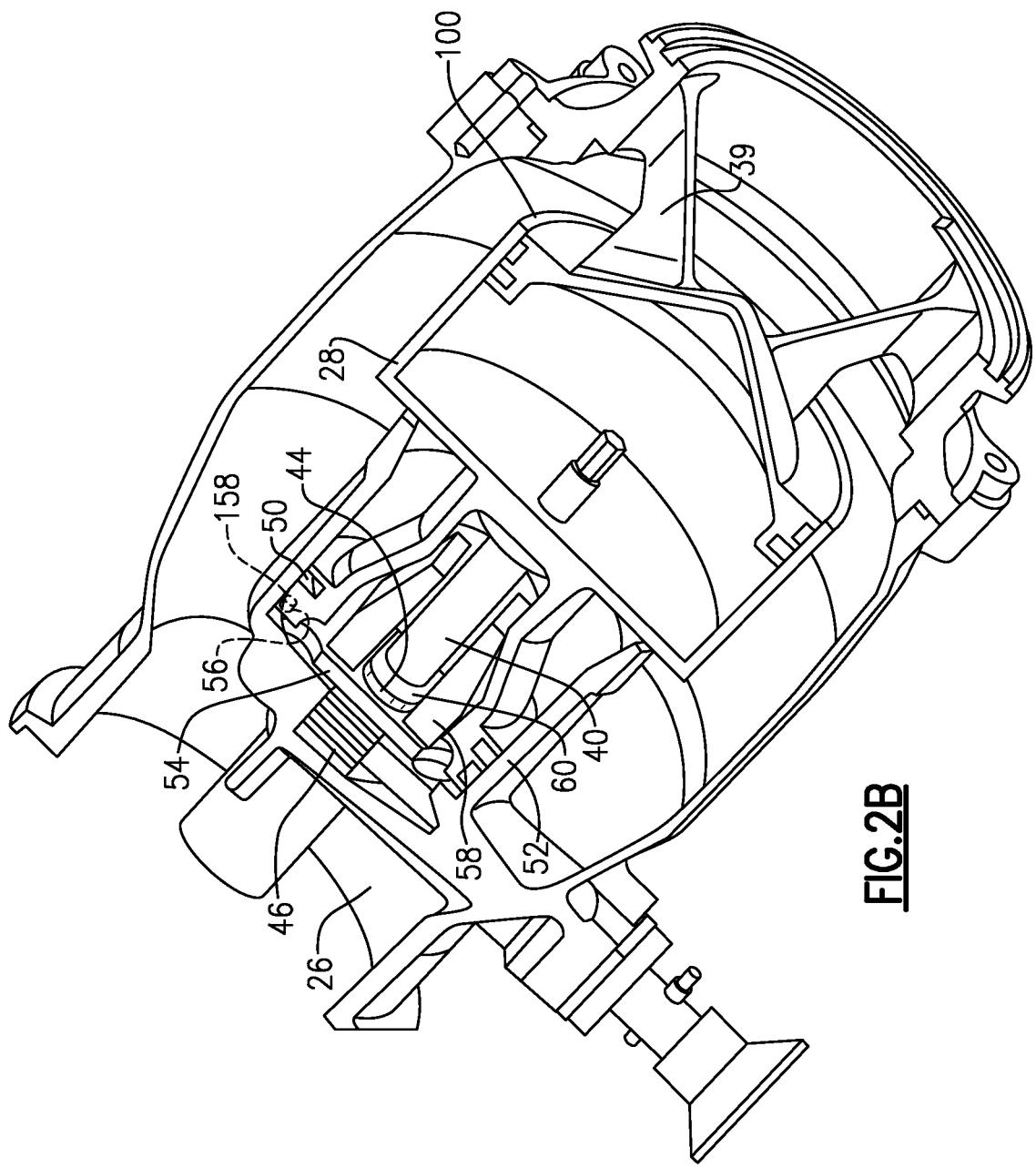
FIG. 2B shows the FIG. 2A valve detail in the open position.

In FIG. 2B, the valve skirt 28 has moved to the open position and the tab 60 rests adjacent the support 54.

Figure 3:
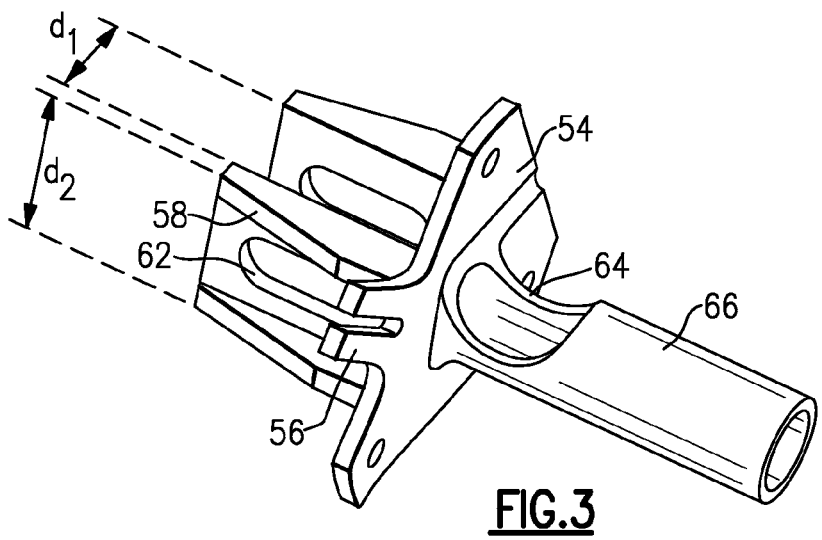
FIG. 3 is a detail of a rack support.

FIG. 3 shows detail of the support 54, including a slot 64 in a rearwardly extending cylindrical portion 66. Slot 64 provides access to the rack teeth 44 for the pinion gear 46. Further, the ears 58 have slots 62. Finally, the locating slot 56 is shown.

FIG. 3 shows support 54, $d_1$ is defined as the distance between internal surfaces of the ears 58. A width of the ears, $d_2$, is measured parallel to flat sides 102 (see FIG. 5) of tab 60. In one embodiment, $d_1$ was 0.614" (1.56 cm) and $d_2$ was 1.000" (2.54 cm).

Figure 4:
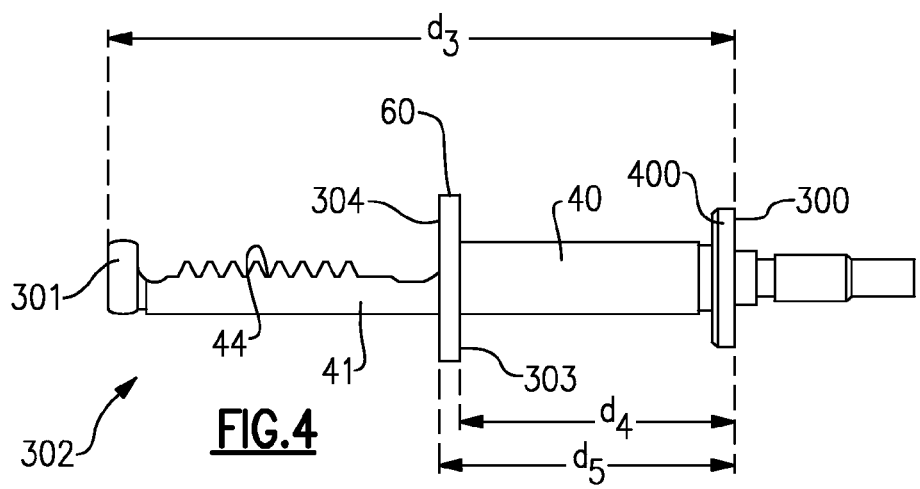
FIG. 4 is a detail of a rack and shaft.

FIG. 4 shows the combined part 302 with shaft 40 integral to a portion 41 that receives rack teeth 44. A distance $d_3$ is defined between a rearward (i.e., facing away from rack teeth 44) surface 300 of an enlarged plate 400 that abuts a surface in valve skirt 28 (see FIGS. 1A and 1B), and a forward end 301 of combined part 302. Plate 400 is secured to skirt 28. A distance $d_4$ is defined between the surface 300 and a rearward surface 303 of tab 60. A distance $d_5$ is defined between the surface 300 and a forward surface 304 of tab 60. In one embodiment $d_3$ was 4.280" (10.87 cm), $d_4$ was 1.880" (4.78 cm) and $d_5$ was 2.005 (5.09 cm). In embodiments, a ratio of $d_3$ to $d_4$ was between 2.27 and 2.28 and a ratio of $d_3$ to $d_5$ was between 2.13 and 2.14.

Figure 5:
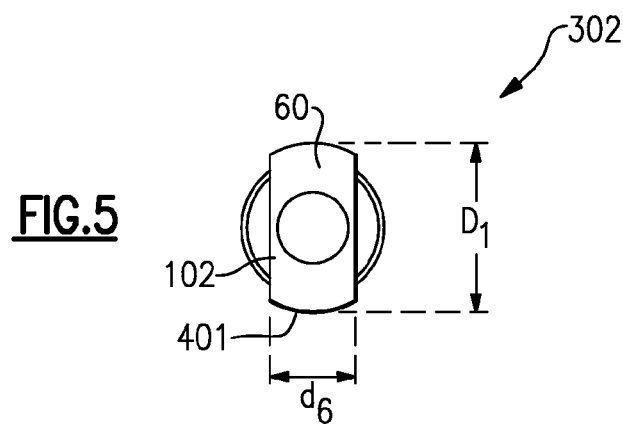
FIG. 5 shows further details of the FIG. 4 rack and shaft.

FIG. 5 is a front view of part 302, showing tab 60. The distance between the flat sides 102 of the tab 60 is defined as $d_6$. The top and bottom ends of the tab 60 are curved along cylindrical sections 401, and a diameter $D_1$ is defined between those cylindrical sections 401. In one embodiment, $D_1$, was 1.166" (2.96 cm) and $d_6$ was 0.596" (1.51 cm). In embodiments, a ratio of $D_1$ to $d_2$ was between 1.12 and 1.22. A ratio of $d_1$ to $d_6$ was between 1.02 and 1.04.

In a method, a part 302 and rack support 54, including details as defined above, are mounted into an air starter valve.

Although embodiments have been disclosed, a worker of ordinary skill in this art would recognize that certain modifications would come within the scope of this invention. For that reason, the following claims should be studied to determine the true scope and content of this invention.

The invention claimed is:

1. A valve comprising:
   a valve skirt connected to a shaft, said shaft extending in a rearward direction away from said valve skirt and having rack teeth at a location spaced away from the valve skirt, an enlarged plate protruding from said shaft, a tab positioned between said valve skirt and said rack teeth; and
   a rack support supporting said rack for axial movement;
   wherein there are a pair of opposed flat surfaces on said tab, with said tab having a part cylindrical section connecting the pair of opposed flat surfaces on said tab, and said rack support having a pair of ears, each having a flat surface, wherein said flat surfaces of said pair of ears face each other and support said pair of opposed flat surfaces of said tab and wherein said pair of flat surfaces of said pair of ears engage said pair of opposed flat surfaces on said rack to limit rotation of said rack;
   wherein a ratio of a distance between said flat surfaces of said pair of ears, and a distance between said pair of opposed flat surfaces on said tab is between 1.02 and 1.04; and
   wherein a ratio of a diameter of said part cylindrical section of said tab and a width of said ears parallel to said opposed flat surfaces of said tab is between 1.12 and 1.22.

2. The valve as set forth in claim 1, wherein a plate distance is defined as a distance between an end of said shaft beyond said rack teeth and a face of said enlarged plate facing away from said rack teeth, and a plate spacing distance is defined as a distance between a first face of said tab, facing away from said rack teeth, and said face of said enlarged plate, and a ratio of said plate distance to said plate spacing distance being between 2.27 and 2.28.

3. The valve as set forth in claim 2, wherein a second face of said tab faces said rack teeth, and a facing distance is defined as a distance between said face of said enlarged plate and said second face of said tab, and a ratio of said plate distance to said facing distance is between 2.13 and 2.14.

4. The valve as set forth in claim 3, wherein another valve is included for communicating air from a source of air to move said valve skirt between open and closed positions.

5. The valve as set forth in claim 1, wherein said rack support has a pin locating slot to receive a pin from an outer housing to ensure said rack support is properly positioned.

6. The valve as set forth in claim 1, wherein another valve is included for communicating air from a source of air to move said valve skirt between open and closed positions.

7. An air starter valve comprising:
   a valve skirt connected to a shaft, said shaft extending in a rearward direction away from said valve skirt and having rack teeth at a location spaced away from said valve skirt, an enlarged plate protruding from said shaft, a tab positioned between said valve skirt and said rack teeth, a rack support supporting said rack for axial movement;
   a manual wrench drive, said manual wrench drive allowing rotation of a pinion, said pinion engaging said rack teeth to allow manual movement of said rack, said shaft and said valve skirt;
   the tab having a first and a second flat surface with said tab having a part cylindrical section connecting the first and second flat surfaces of said tab, and said rack support having a first and second ear, each ear having a respective flat surface, with the respective flat surface of the first and second ear supporting respectively the first and second flat surface of the tab, wherein the respective flat surface of the first and second ear engage respectively the first and second flat surface of the tab to limit rotation of said rack;
   wherein the flat surfaces of the first and second ear oppose each other, and wherein a ratio of a distance between the flat surfaces of the first and second ear, and a distance between said first and second flat surfaces on said tab is between 1.02 and 1.04;
   wherein the ratio of a diameter of the part cylindrical section of said tab and a width of said ears in a direction parallel to the flat surfaces of the first and second ear is between 1.12 and 1.22; and
   a valve for communicating air from a source of air to move said valve skirt between open and closed positions.

8. The air starter valve as set forth in claim 7, wherein a plate distance is defined as a distance between an end of said shaft beyond said rack teeth and a face of said enlarged plate facing away from said rack teeth, and a plate spacing distance is defined as a distance between a first face of said tab, facing away from said rack teeth, and said face of said enlarged plate, and a ratio of said plate distance to said plate spacing distance being between 2.27 and 2.28.

9. The air starter valve as set forth in claim 8, wherein a second face of said tab faces said rack teeth, and a facing distance is defined as a distance between said face of said enlarged plate and said second face of said tab, and a ratio of said plate distance to said facing distance is between 2.13 and 2.14.

10. The air starter valve as set forth in claim 7, wherein said rack support has a pin locating slot to receive a pin from an outer housing to ensure said rack support is properly positioned.

11. A gas turbine engine comprising:
    a starter and a turbine;
    a source of air connected to an air starter valve for supplying air to said starter when said gas turbine engine is started; and
    the air starter valve having a valve skirt connected to a shaft, said shaft extending in a rearward direction away from said skirt and having rack teeth at a location spaced away from said skirt, an enlarged plate protruding from said shaft, a tab positioned between said valve skirt and said rack teeth, a rack support supporting said rack for axial movement, and a manual wrench drive, said manual wrench drive allowing rotation of a pinion, said pinion engaging said rack teeth to allow manual movement of said rack, said shaft and said skirt;
    the tab having a first and a second flat surface, said tab having a part cylindrical section connecting the first and second flat surface of said tab, and said first and second surface of the tab facing in opposite directions, said rack support having a first and second ear, each ear having a respective flat surface, with the respective flat surface of the first and second ear supporting respectively the first and second flat surface of the tab, wherein the respective flat surface of the first and second ear engage respectively the first and second flat surface of the tab to limit rotation of said rack;
    wherein the respective flat surfaces of the first and second ear oppose each other, and wherein a ratio of a distance between the respective flat surfaces of the first and second ear, and a distance between said first and second flat surfaces on said tab is between 1.02 and 1.04;

wherein the ratio of a diameter of the-part cylindrical section of said tab and a width of said ears in a direction parallel to the respective flat surfaces of the first and second ear is between 1.12 and 1.22; and another valve for communicating air from the source of air to move said skirt between open and closed positions.

12. The gas turbine engine as set forth in claim 11, wherein a plate distance is defined as a distance between an end of said shaft beyond said rack teeth and a face of said enlarged plate facing away from said rack teeth, and a plate spacing distance is defined as a distance between a first face of said tab, facing away from said rack teeth, and said face of said enlarged plate, and a ratio of said plate distance to said plate spacing distance being between 2.27 and 2.28.

13. The gas turbine engine as set forth in claim 12, wherein a second face of said tab faces said rack teeth, and a facing distance is defined as a distance between said face of said enlarged plate and said second face of said tab, and a ratio of said plate distance to said facing distance is between 2.13 and 2.14.

14. The gas turbine engine as set forth in claim 11, wherein said rack support has a pin locating slot to receive a pin from an outer housing to ensure said rack support is properly positioned.

15. A method of replacing a rack and shaft in an air starter valve including the steps of:

connecting the shaft to a valve skirt, said shaft having rack teeth, and moving a pinion gear to engage said rack teeth; and said shaft extending in a rearward direction away from said valve skirt and having rack teeth at a location spaced away from the valve skirt, an enlarged plate protruding from said shaft, a tab positioned between said valve skirt and said rack teeth, and a rack support supporting said rack for axial movement;

the tab having a first and a second flat surface, said tab having a part cylindrical section connecting the first and second flat surface of said tab, and said rack support having a first and second ear, each ear having a respective flat surface, with the respective flat surface of the first and second ear supporting respectively the first and second flat surface of the tab, wherein the respective flat surface of the first and second ear engage respectively the first and second flat surface of the tab to limit rotation of said rack;

wherein the respective flat surfaces of the first and second ear oppose each other, and wherein a ratio of a distance between the respective flat surfaces of the first and second ear, and a distance between said first and second flat surfaces on said tab is between 1.02 and 1.04; and wherein the ratio of a diameter of the-part cylindrical section of said tab and a width of said ears in a direction parallel to the respective flat surfaces of the first and second ear is between 1.12 and 1.22; and another valve for communicating air from a source of air to move said valve skirt between open and closed positions.

16. The method as set forth in claim 15, wherein plate distance is defined as a distance between an end of said shaft beyond said rack teeth and a face of said enlarged plate facing away from said rack teeth, and a plate spacing distance is defined as a distance between a first face of said tab, facing away from said rack teeth and said face of said enlarged plate, and a ratio of said plate distance to said plate spacing distance being between 2.27 and 2.28.

17. The method as set forth in claim 16, wherein a second face of said tab faces said rack teeth, and a facing distance is defined as a distance between said face of said enlarged plate and said second face of said tab, and a ratio of said plate distance to said facing distance is between 2.13 and 2.14.

\* \* \* \* \*

UNITED STATES PATENT AND TRADEMARK OFFICE
CERTIFICATE OF CORRECTION

PATENT NO. : 9,157,374 B2  
APPLICATION NO. : 13/600415  
DATED : October 13, 2015  
INVENTOR(S) : Todd D. Cortelli Page 1 of 1

It is certified that error appears in the above-identified patent and that said Letters Patent is hereby corrected as shown below:

IN THE CLAIMS:

In claim 16, column 6, line 22; after "wherein" insert --a--

Signed and Sealed this
Twenty-ninth Day of March, 2016

Michelle K. Lee
*Director of the United States Patent and Trademark Office*